(12) United States Patent
Hiraga

(10) Patent No.: US 9,724,776 B2
(45) Date of Patent: Aug. 8, 2017

(54) WIRE ELECTRICAL DISCHARGE MACHINE WHICH CORRECTS MACHINING PATH IN CORNER PORTION

(71) Applicant: FANUC CORPORATION, Minamitsuru-gun, Yamanashi (JP)

(72) Inventor: Kaoru Hiraga, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 101 days.

(21) Appl. No.: 14/107,283

(22) Filed: Dec. 16, 2013

(65) Prior Publication Data

US 2014/0190940 A1    Jul. 10, 2014

(30) Foreign Application Priority Data

Jan. 9, 2013  (JP) .................................. 2013-002052
May 2, 2013  (JP) .................................. 2013-097035

(51) Int. Cl.
*B23H 1/00* (2006.01)
*B23H 7/06* (2006.01)
*G05B 19/4097* (2006.01)

(52) U.S. Cl.
CPC ............. *B23H 7/06* (2013.01); *B23H 7/065* (2013.01); *G05B 19/4097* (2013.01); *G05B 2219/45221* (2013.01); *G05B 2219/49164* (2013.01)

(58) Field of Classification Search
CPC ............. B23H 7/02; B23H 7/06; B23H 7/20
USPC ..................... 219/68, 69.12, 69.13
See application file for complete search history.

(56) References Cited

U.S. PATENT DOCUMENTS

| | | | |
|---|---|---|---|
| 4,546,227 A * | 10/1985 | Gamo ................... | B23H 7/065 |
| | | | 219/69.12 |
| 5,504,294 A | 4/1996 | Izumiya et al. | |
| 5,756,954 A * | 5/1998 | Kamiguchi et al. ....... | 219/69.12 |
| 6,774,334 B1 | 8/2004 | Kobayashi | |
| 6,832,126 B2 * | 12/2004 | Irie ............................... | 700/162 |
| 6,924,453 B2 * | 8/2005 | Kawahara et al. ......... | 219/69.12 |
| 6,998,561 B2 * | 2/2006 | Kato et al. .................. | 219/69.12 |
| 6,998,562 B2 | 2/2006 | Arakawa et al. | |
| 7,371,989 B2 * | 5/2008 | Miyajima et al. ......... | 219/69.12 |

(Continued)

FOREIGN PATENT DOCUMENTS

| | | |
|---|---|---|
| CN | 1413134 A | 4/2003 |
| CN | 1421290 A | 6/2003 |

(Continued)

OTHER PUBLICATIONS

Decision to Grant a Patent mailed Mar. 3, 2015, corresponding to Japanese patent application No. 2013-097035.

(Continued)

*Primary Examiner* — Dana Ross
*Assistant Examiner* — Ayub Maye
(74) *Attorney, Agent, or Firm* — Hauptman Ham, LLP

(57) ABSTRACT

In a corner portion formed at an intersection of a first block to be machined first and a second block to be machined second, an end point of the first block is extended. Then, after moving from the first block to the extended end point of the first block, a wire electrode of an electrical discharge machine returns to an end point of the original block (an end point of the original first block and a start point of the original second block) therefrom along the same path as before, and machines the second block therefrom.

3 Claims, 10 Drawing Sheets

(56) References Cited

U.S. PATENT DOCUMENTS

2003/0098293 A1    5/2003   Sato et al.
2008/0251500 A1   10/2008   Hiraga et al.

FOREIGN PATENT DOCUMENTS

| | | | |
|---|---|---|---|
| EP | 2272614 A2 | 1/2011 | |
| EP | 2272614 A3 | 6/2011 | |
| JP | 57-149123 A | 9/1982 | |
| JP | 59142023 A * | 8/1984 | ................ B23P 1/12 |
| JP | 59-175925 A | 10/1984 | |
| JP | 61-219529 A | 9/1986 | |
| JP | 5228736 A | 9/1993 | |
| JP | 07-024645 A | 1/1995 | |
| JP | 07-285029 A | 10/1995 | |
| JP | 11-207527 A | 8/1999 | |
| JP | 2000084743 A * | 3/2000 | ............... B23H 7/06 |
| JP | 2004-216496 A | 8/2004 | |

OTHER PUBLICATIONS

Office Action mailed May 27, 2014, corresponds to Japanese patent application No. 2013-097035.
Extended European Search Report issued Oct. 24, 2014, corresponding to European patent application No. 13195873.8.

* cited by examiner

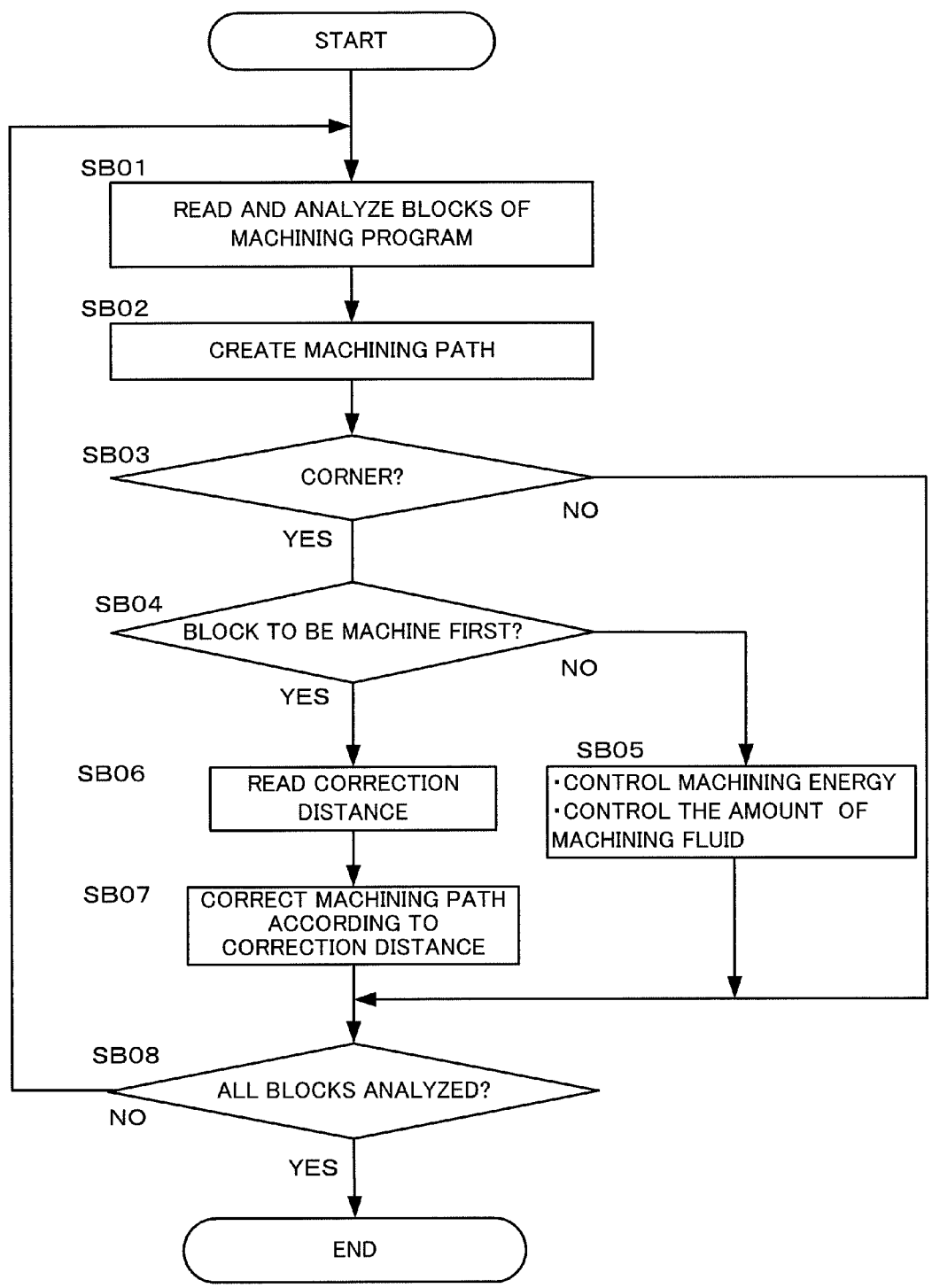

WIRE ELECTRICAL DISCHARGE MACHINE WHICH CORRECTS MACHINING PATH IN CORNER PORTION

RELATED APPLICATIONS

The present application claims priority to Japanese Application Number 2013-002052, filed Jan. 9, 2013 and Japanese Application Number 2013-097035, filed May 2, 2013, the disclosures of which are hereby incorporated by reference herein in their entirety.

BACKGROUND OF THE INVENTION

Field of the Invention

The present invention relates to a wire electrical discharge machine having a function to correct a machining path in a corner portion.

Description of the Related Art

In wire electrical discharge machining, it is known that a wire electrode deflects due to a discharge repulsion force produced between wire electrode and workpiece or due to turbulence of a machining fluid. When machining is performed along a straight line, the wire electrode deflects in a direction opposite a machining/traveling direction, but this does not adversely affect machining shape.

As shown in FIG. 1, in machining a corner portion of a workpiece 2, if there is no deflection of a wire electrode 3, a machined groove is formed by machining along a machining path 4 in a direction corresponding to a machining direction 6. Actually, however, as shown in FIG. 2, due to a deflection amount 9 of the wire electrode (deflection amount of the wire electrode rearward in the machining/traveling direction), a discrepancy occurs in a corner portion between the machining path 4 and an actual wire trajectory (wire electrode trajectory 12 in the corner portion), resulting in a chipped convex portion 11 or unremoved concave portion 10 on the workpiece 2. In this way, there is a problem in that the corner portion is affected greatly by the deflection amount 9 of the wire electrode, greatly reducing shape accuracy in the concave portion, resulting in a so-called "corner droop," and making it impossible to obtain a desired shape.

Various measures have been devised to solve such a problem, and the measures are roughly classified into the follows two major types.

(1) A method which reduces deflection of the wire electrode by reducing machining speed and the amount of machining fluid in a corner portion or extending a discharge quiescent time (so-called "machining fluid control" or "energy control")

(2) A method which corrects a machining path by taking the deflection of the wire electrode into consideration Of the two measures, the method (2) which corrects a machining path has the advantage of being able to reduce machining time, and some concrete methods have been proposed so far.

Japanese Patent Application Laid-Open No. 61-219529 discloses a controller, comprising: a controller adapted to control an amount of travel of a wire electrode relative to work; a storage adapted to store a deflection amount of the wire electrode on a machined surface of the work; a calculator adapted to successively determine a machining direction of the wire electrode through calculations; and a driver adapted to drive the wire electrode using an amount of correction equal to the deflection amount of the wire electrode.

Japanese Patent Application Laid-Open No. 7-24645 discloses a wire electrical discharge machining apparatus comprising: a controller adapted to control an amount of relative travel of a wire electrode; a corner detector adapted to detect a corner portion in a machining path; and a machining path corrector adapted to sequentially correct a tangential movement over a predetermined distance in the detected corner portion, a movement along the corner portion over a predetermined distance, and an asymptotic return movement.

Japanese Patent Application Laid-Open No. 11-207527 discloses a wire electrical discharge machining apparatus wherein: a first machining path is extended in a corner portion along a tangent in a machining/traveling direction; second and third corrected paths are set at angles larger than a machined corner; and the machining path is corrected so as to return to the original machining path along a fourth path.

However, the technique described in the prior art document described above is proposed as a method for correcting typical convex corners of simple shapes, and when the correction method is applies to a concave corner as shown in FIG. 3, there is a problem in that the wire electrode will bite into a machined surface which is to become a product, producing flaws in the concave corner portion and rendering the machined product into a defective item. Also, even when the correction method is applied to a convex corner, if the convex corner has a shape accompanied by an arc block such as shown in FIG. 11, there is a problem in that machined grooves will intersect each other, producing a portion called a core, as shown in FIG. 14, which can cause machining defects.

Description of corrections to concave corners are provided only by techniques such as disclosed in Japanese Patent Application Laid-Open No. 7-285029. The patent document discloses a method for machining a sharp edge: comprising saving a deflection amount of a wire electrode during wire-cut electrical discharge machining under each machining condition; and correcting a machining path based on the saved deflection amounts so as to make the wire electrode escape by an extra amount in a traveling direction during punching and so as to make a cut during die machining.

The technique disclosed in Japanese Patent Application Laid-Open No. 7-285029 described above proposes a method for correcting a machining path in a concave corner portion by taking die machining as an example, and the method involves making a path correction so as to move the wire electrode in a direction of a line which bisects an angle between a first block (block to be machined first) and a second block (block to be machined second) which form a corner, but the direction of the line does not coincide with such a direction as to cancel off the deflection amount of the wire electrode. Therefore, the larger the angle between the first block and second block, the larger a discrepancy between a moving direction in which the wire electrode is moved to correct the machining path and an instructed direction of the second block. Thus, such a machining path correction method cannot be said to be an effective correction method for concave corners.

Also, when a machining path correction such as shown in FIG. 5 is made (the wire electrode is moved from straight line A-B to straight line B-C to straight line C-B and to straight line B-D) using the technique of Japanese Patent Application Laid-Open No. 7-285029 described above, there is a possibility of damaging an electro-discharge-machined product.

Specifically, as shown in FIG. 2, the deflection of the wire electrode 3 occurs in a direction opposite the machining direction 6 of the wire electrode, causing an actual position 7 of the wire electrode 3 to deviate from a instructed position 8 of the wire electrode 3. When the machining direction 6 of the wire electrode 3 changes, the wire electrode 3 actually advances by taking a shortcut through a corner portion (see the wire electrode trajectory 12 in a corner portion). That is, it is not that the wire electrode 3 deflected rearward in the wire electrode traveling direction follows the wire electrode trajectory 12 with a delay. Thus, when the machining path in FIG. 5 is corrected from point B to point C, the shortcut will create a nick on the product. Also, since the direction of machining path correction coincides with the direction of the line which bisects the angle between the first block and second block which form a corner, there is a problem in that the larger the angle between the first block and second block, the larger the impact of the shortcut, and consequently the deeper the nick.

In this way, Japanese Patent Application Laid-Open No. 7-285029 adopts a method which makes corrections based on the deflection amounts of the wire electrode, but only considers square die machining (in which the angle between the first block and second block is a right angle) and does not propose an appropriate machining method for concave corner portions with an arbitrary angle.

SUMMARY OF THE INVENTION

Thus, an object of the present invention is to provide a wire electrical discharge machine provided with a machining path correction method for appropriately correcting a machining path in a concave corner portion, reducing a machining time in the concave corner portion, and reducing a machining time in a convex corner as well without producing defective items.

The present invention concerns a wire electrical discharge machine adapted to create a machining path based on an axis movement command from a machining program and perform machining by moving a wire electrode and a workpiece relative to each other according to the created machining path, the wire electrical discharge machine comprising a machining path correction unit adapted to correct the machining path such that in a corner portion formed at an intersection of two consecutive movement blocks in the created machining path, the two consecutive movement blocks being a first block to be machined first and a second block to be machined second, a corrected path will be generated by extending an end point of the first block, that when an extended block end point is reached by moving along the corrected path, a machining path which returns to the end point of the original block along the corrected path will be newly created, and that the second block will be machined by continuing from the newly created machining path.

A distance by which the end point of the first block is extended may be set equal to a deflection amount of the wire electrode.

In the corner portion, the second block may be machined by reducing machining energy or the amount of machining fluid compared to when the first block is machined.

The present invention can provide a wire electrical discharge machine provided with a machining path correction method for appropriately correcting a machining path in a concave corner portion, reducing a machining time in the concave corner portion, and reducing a machining time in a convex corner as well without producing defective items.

BRIEF DESCRIPTION OF THE DRAWINGS

The above and other objects and features of the present invention will become more apparent from the following description of the embodiments taken in conjunction with the accompanying drawings, wherein:

FIG. 17 is a flowchart illustrating a machining path correction process performed by the wire electrical discharge machine of FIG. 15.

DETAILED DESCRIPTION OF THE PREFERRED EMBODIMENTS

The present invention is a wire electrical discharge machine adapted to correct a machining path by focusing on characteristics of a concave corner or a corner accompanied by an arc block and configured to be able to reduce machining time compared to when such a corner portion is machined by controlling a machining fluid or machining energy.

First Embodiment

In a concave corner formed by two consecutive blocks (block 1 and block 2), when a correction is made so as to extend a block to be machined first (block 1), if a correction distance gets longer, there is danger that the product will be damaged as described above. However, unlike a convex corner, in the case of a concave corner, it is not necessary in the first place to extend the correction distance.

Figure 6:
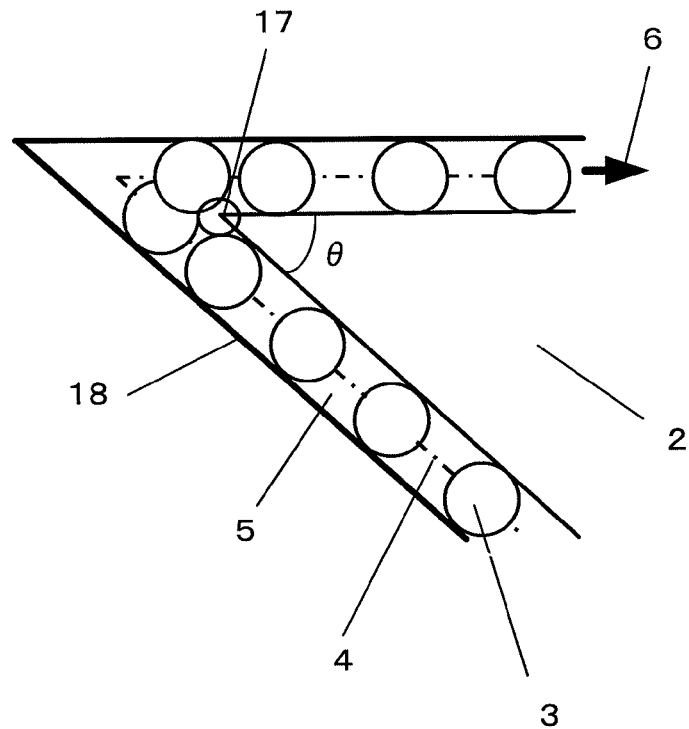
FIG. 6 is a diagram illustrating machining of a convex corner portion.

As shown in FIG. 6, in a vertex portion of a typical convex corner, the wire electrode 3 which separates from the vertex portion once when turning around the corner portion approaches the vertex portion again when shifting to a block to be machined second (block 2). This results in concentration of electrical discharges in a vertex portion 17. The concentration of electrical discharges can cause degradation of shape accuracy in the corner portion. To avoid this situation, when machining of a block to be machine first (block 1) is finished, it is necessary to make the wire electrode 3 escape far away from the corner vertex portion 17.

Figure 7:
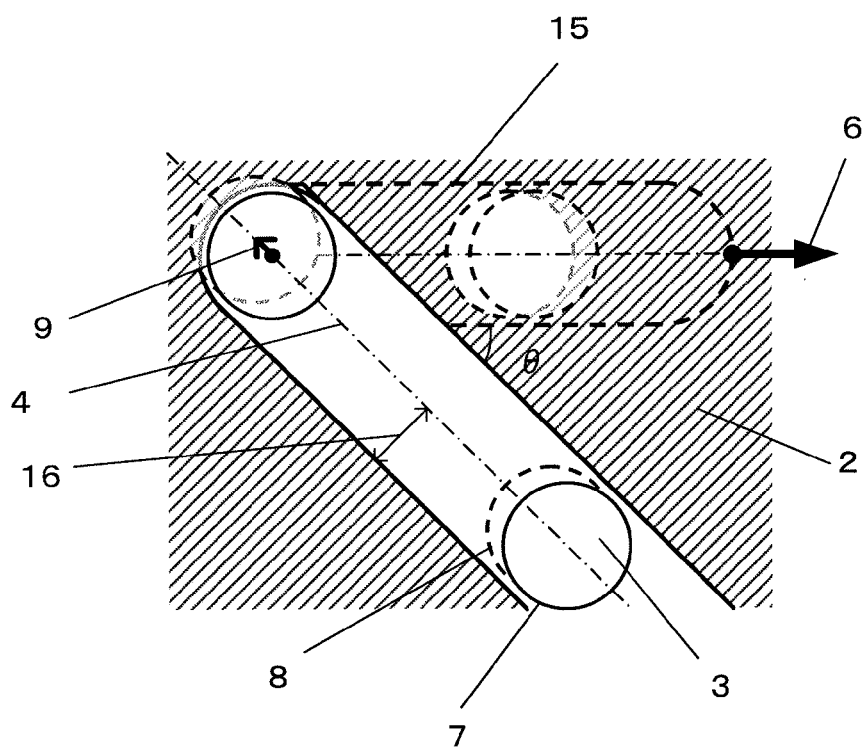
FIG. 7 is a diagram illustrating machining of a concave corner portion.

On the other hand, in a vertex portion of a concave corner, as shown in FIG. 7, when turning around the corner portion, the wire electrode 3 escapes by changing the traveling direction by itself, so there is no need to be concerned about concentration of electrical discharges in the corner portion. Therefore, during machining of a concave corner, it is only necessary to correct rearward deflection of the wire electrode 3 in the traveling direction by flexibility of the wire electrode. That is, if the end point of the machining block (block 1) is extended by the amount equal to the deflection amount 9 of the wire electrode, when instructed position of the wire electrode reaches the extended end point, the wire electrode 3 deflected rearward in the traveling direction of the wire due to the flexibility is placed exactly at a vertex of the corner (the end point of block 1). Also, since the deflection amount 9 and deflecting direction of the wire electrode do not depend on a corner angle θ of the concave corner, if the end point of the block to be machine first (block 1) is extended by the amount equal to the deflection amount 9 of the wire electrode, the actual wire electrode 3 is placed at the corner vertex regardless of the corner angle θ.

Figure 8:
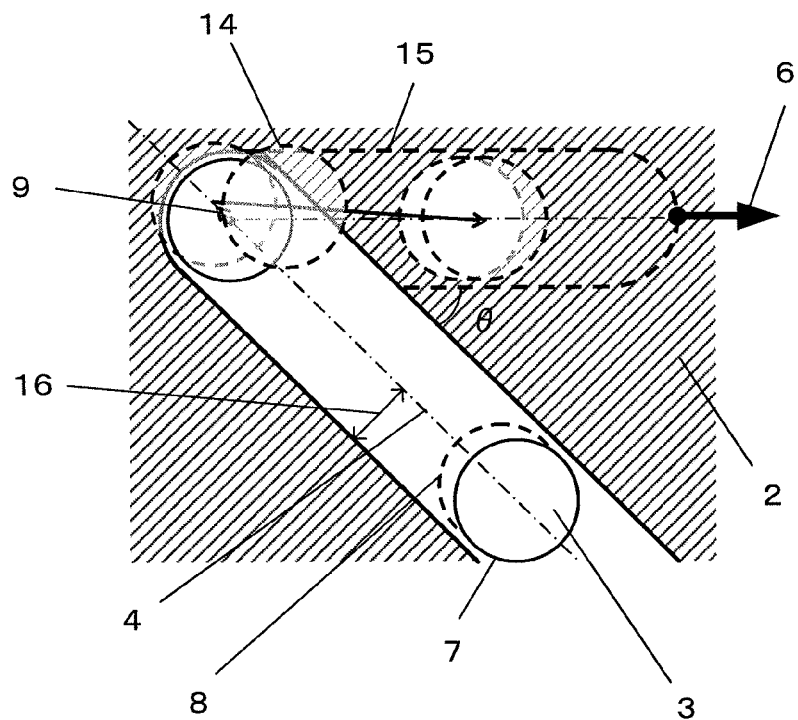
FIG. 8 is a diagram illustrating a problem which occurs in machining a concave corner portion if a correction is made so as to return to an original machining path at an intermediate point of a block to be machined second.

In the case of a typical convex corner, conventionally the machining path is corrected by extending the end point of the block to be machine first and returning the wire electrode from the extended end point to the original machining path at an intermediate point of the block to be machined second. However, if a correction is made in this way, the wire electrode 3 advances along a path off the original machining path by veering toward the product side as shown in FIG. 8 and bites into the product in a region indicated by symbol 14 on the product side (machined surface 15). Consequently, there is a possibility of damaging the product as well in an interval passed before the correction is finished. However, in the case of a typical convex corner, the process of keeping the wire electrode away from the vertex portion in this way is effective in avoiding concentration of electrical discharges.

Figure 9:
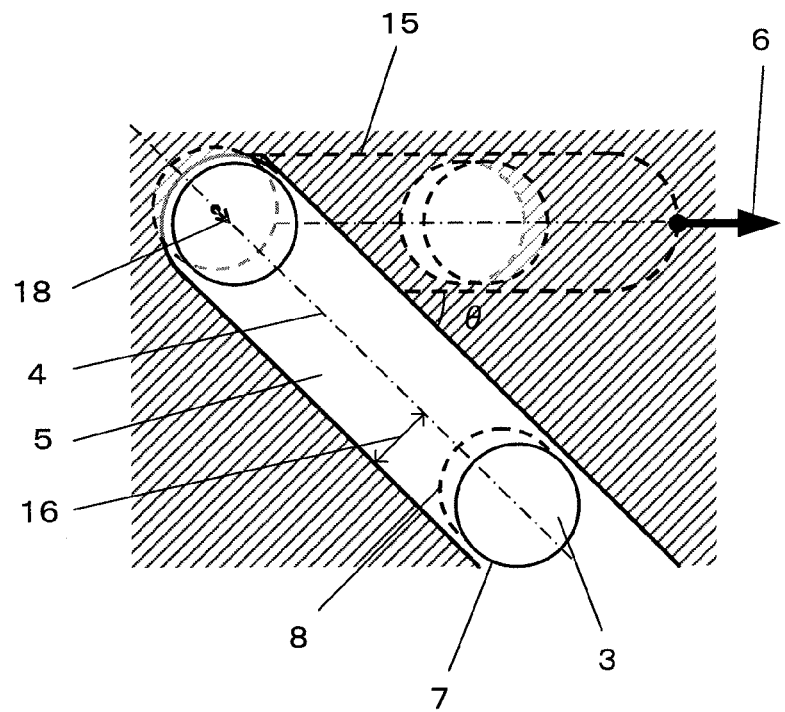
FIG. 9 is a diagram illustrating a machining state which results when electrical discharge machining is performed by a wire electrical discharge machine according to a first embodiment of the present invention based on a corrected machining path.

Also, in the case of a concave corner, since there is no concern of electrical discharge concentration, after reaching the corner vertex, the wire electrode 3 can keep advancing along the machining path. Therefore, the block to be machine first (block 1) is extended (corrected) from its end point by the amount equal to the deflection amount 9 of the wire electrode and the machining path is corrected so as to return from the end point of the extended block to the end point (corner vertex) of the pre-extension block (the original block) along just the same path, as indicated by an arrow of symbol 18 in FIG. 9. Subsequently, the wire electrode can advance along the machining path from a start point of the block to be machined second (block 2) (i.e., from the end point of block 1 before correction).

Figure 11:
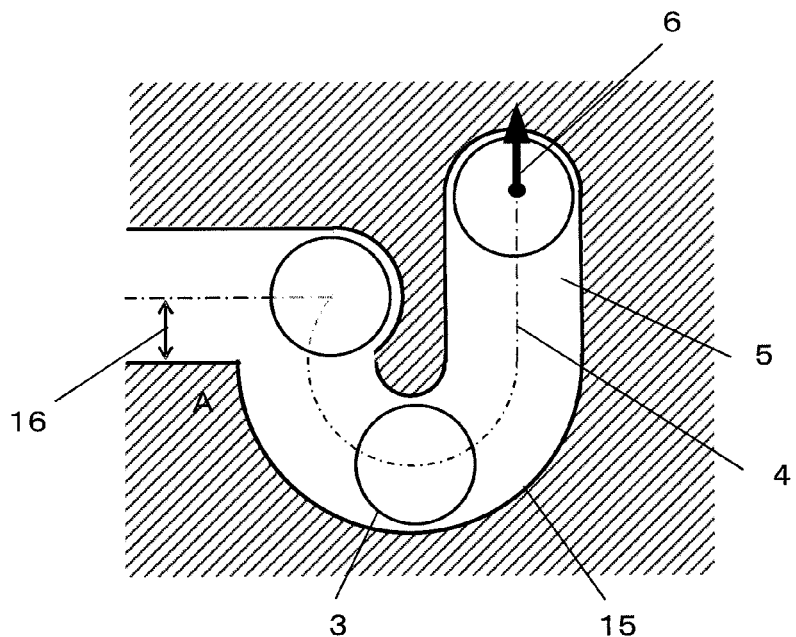
FIG. 11 is a diagram illustrating machining of a corner portion accompanied by an arc block.
Figure 14:
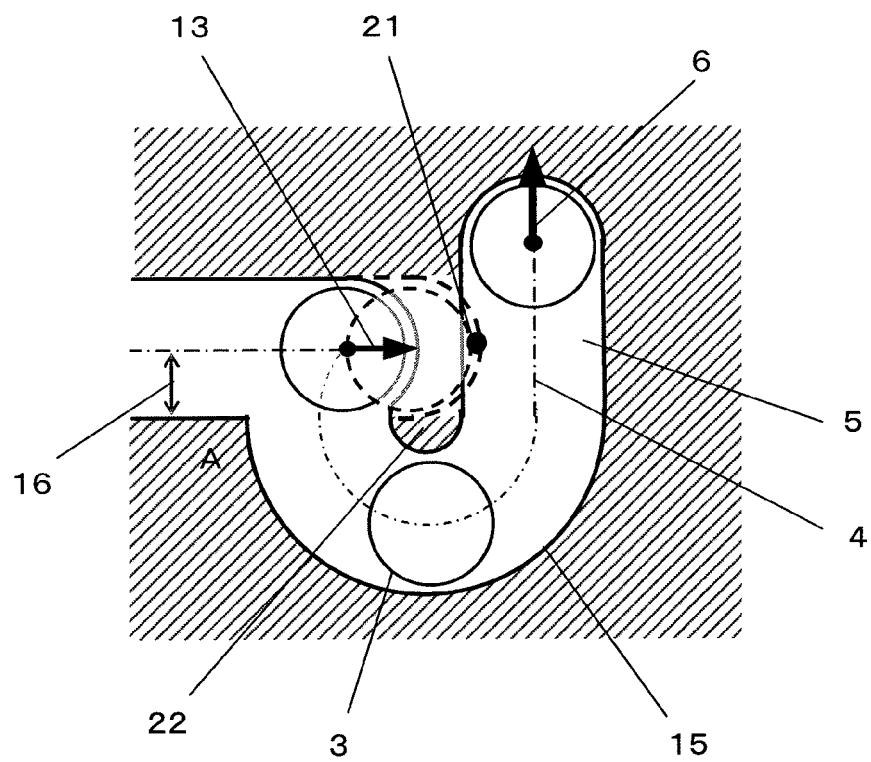
FIG. 14 is a diagram illustrating a problem in that a core is produced when a corner portion accompanied by an arc block is machined.

On the other hand, even in the case of a convex corner, with a shape containing an arc block as with corner A of FIG. 11, if a correction involves extending a block to be machine first as in the case of a typical convex corner, machined grooves 5 will intersect each other, producing a core 22, as shown in FIG. 14. This can cause a problem of a short-circuit or a broken wire or a problem in that the core 22 may damage the product when cut off.

Figure 1:
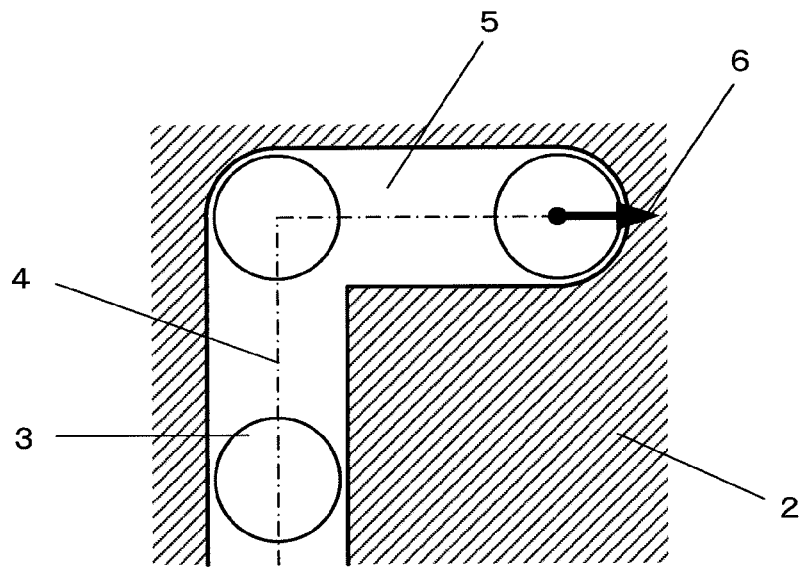
FIG. 1 is a diagram illustrating how machining is carried out along a machining path during machining of a corner portion when a wire electrode is free of deflection.
Figure 2:
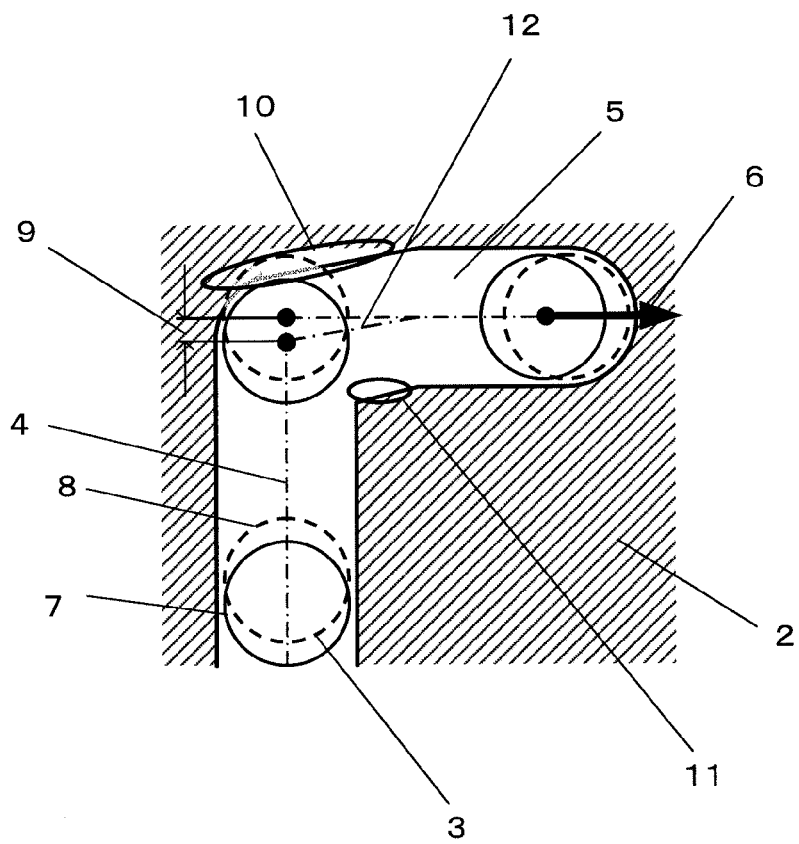
FIG. 2 is a diagram illustrating how a discrepancy between a machining path and actual wire trajectory occurs in a corner portion due to deflection of the wire electrode, resulting in a chipped convex portion or unremoved concave portion on a workpiece.
Figure 3:
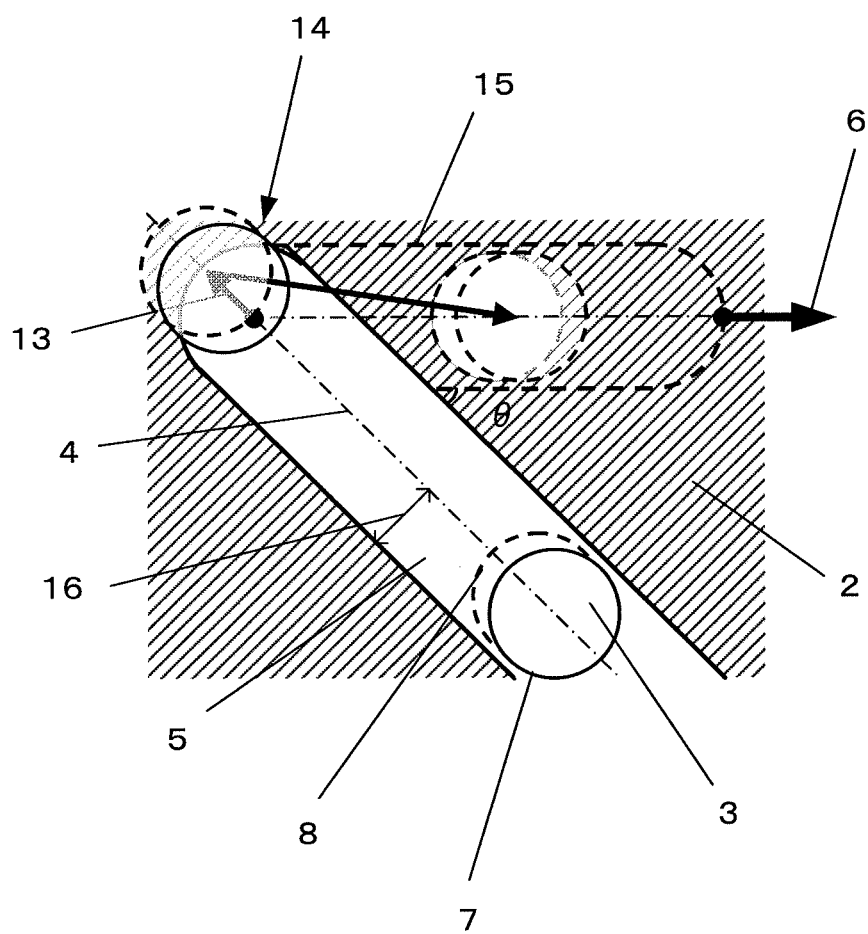
FIG. 3 is a diagram illustrating how a corrected path bites into a product, consequently damaging the product, when a concave corner portion is machined using a technique disclosed in a prior art document.
Figure 4:
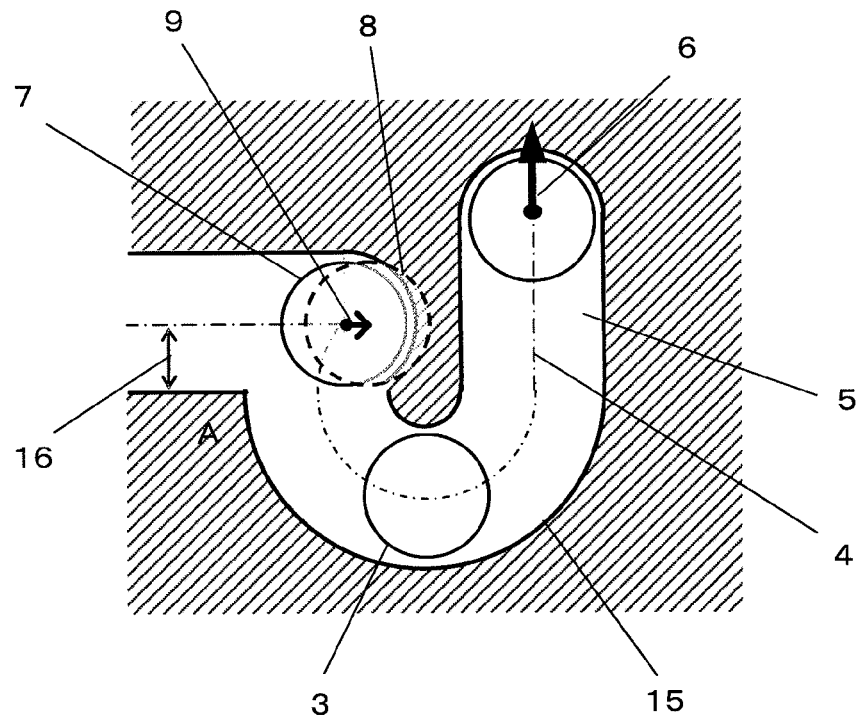
FIG. 4 is a diagram illustrating a method for correcting a machining path so as not to produce a core in machining a corner portion accompanied by an arc block.
Figure 5:
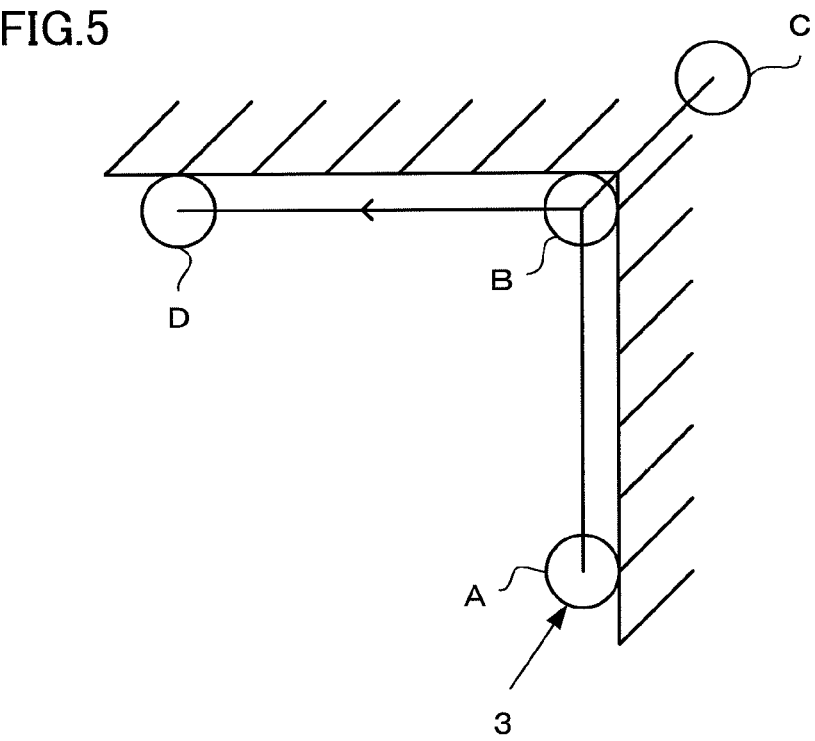
FIG. 5 is a diagram illustrating a method for correcting a tool path in die machining disclosed in a prior art document.

Even in such a case, as with the concave corner described above, if the machining path is corrected such that the block to be machine first is extended (corrected) from its end point by the amount equal to the deflection amount 9 of the wire electrode and subsequently returns to the end point (corner vertex) of the pre-extension block (original block) along just the same path, then the wire electrode 3 is placed at the corner vertex (end point of the machining block before the correction), without involving danger of producing a core 22, and subsequently, the wire electrode can advance along the machining path from a start point of the block to be machined second (see FIG. 4).

In the case of a typical convex corner, although the process of keeping the wire electrode away from the vertex portion is also effective in avoiding concentration of electrical discharges as described above, the effect of lessening a chipped convex portion 11 is also available if a correction is made so as to offset deflection of the wire electrode 3 at the corner vertex (end point of the machining block before the correction) and then the wire electrode advances along the machining path from a start point of the block to be machined second in this way.

Although a corner in which the block to be machine first is rectilinear and the block to be machined second is arc-shaped has been described herein as a corner accompanied by an arc block, there is similarly no problem if the present invention is applied to a corner in which the block to be machine first is arc-shaped (block to be machine first (arc) 23) while the block to be machined second is rectilinear (block to be machined second (straight line) 24) or to a corner in which both blocks are arc-shaped.

Figure 16:
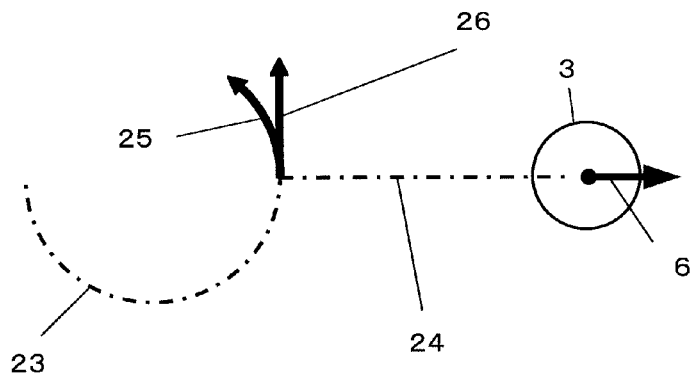
FIG. 16 is a diagram illustrating a direction in which, when a block to be machined first is arc-shaped, an end point of the block is extended.

Also, when the block to be machine first is arc-shaped, the direction in which the end point of the block is extended to correct the machining shape may be a circumferential direction 25 or tangential direction 26 of the circle (see FIG. 16).

Incidentally, with conventional techniques for handling corners, regardless of concavity and convexity of shape, the wire electrode is caused to advance into a corner vertex portion by reducing electrical-discharge energy and the amount of machining fluid ahead of the end point of the block to be machine first (corner vertex) and thereby preventing escape of the wire electrode caused by a discharge repulsion force or machining fluid. This makes it necessary to reduce the machining speed when the wire electrode 3 advances into the corner, to prevent a broken wire or short-circuit of the wire electrode 3. Also, in a corner vertex portion, to eliminate any portion left unremoved from a concave corner portion, the wire electrode 3 is stopped to wait until deflection of the wire electrode 3 is relieved. This presents a problem of increased machining time although there is no problem in machining accuracy.

In dealing with this problem, when the machining path is corrected by the electric discharge machine according to the present invention, since the wire electrode 3 can reach the corner vertex without decelerating ahead of the corner vertex, the machining time can be reduced compared to conventional techniques. Also, although the correction distance has been described herein by taking the deflection amount 9 of the wire electrode as an example, the correction distance may be set to the deflection amount of the wire electrode determined experimentally or an approximate constant inferred from strength of a discharge repulsion force or machining fluid flow determined from machining conditions, where the approximate constant corresponds to a deflection amount of the wire electrode.

Figure 10:
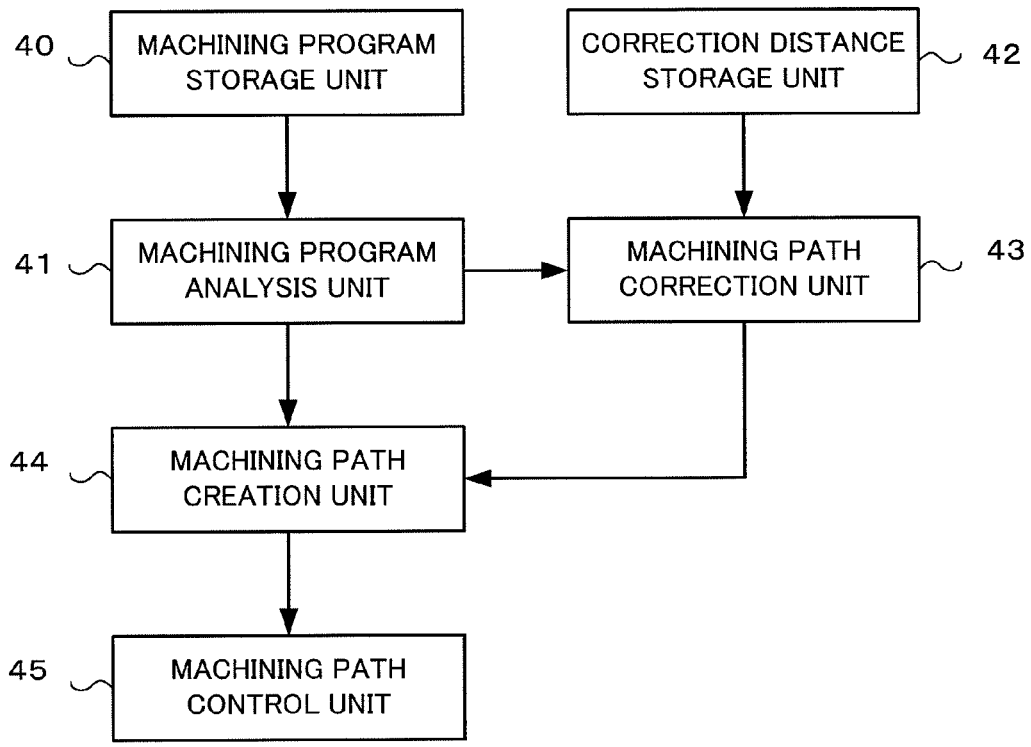
FIG. 10 is a block diagram illustrating principal part of the wire electrical discharge machine according to the first embodiment of the present invention.

Principal part of the wire electrical discharge machine according to the first embodiment of the present invention will be described with reference to FIG. 10.

A machining program stored in a machining program storage unit 40 is passed to a machining program analysis unit 41, and data about a machining path analyzed by the machining program analysis unit 41 is passed to a machining path creation unit 44. When a corner portion is detected, the machining program analysis unit 41 gives path correction instructions to a machining path correction unit 43. Furthermore, a correction distance stored in a correction distance storage unit 42 and used to correct the machining path is passed to the machining path correction unit 43.

Upon receiving the path correction instructions from the machining program analysis unit 41, the machining path correction unit 43 receives the correction distance from the correction distance storage unit 42, creates a corrected path of the corner portion, and passes the created corrected path to the machining path creation unit 44. The machining path creation unit 44 receives the data about the machining path from the machining program analysis unit 41, and creates a machining path. Also, upon receiving the corrected path from the machining path correction unit 43, the machining path creation unit 44 creates a machining path by reflecting the corrected path and passes the created machining path to a machining path control unit 45.

The machining path control unit 45 moves the wire electrode relative to a workpiece according to the machining path received from the machining path creation unit 44.

Figure 12:
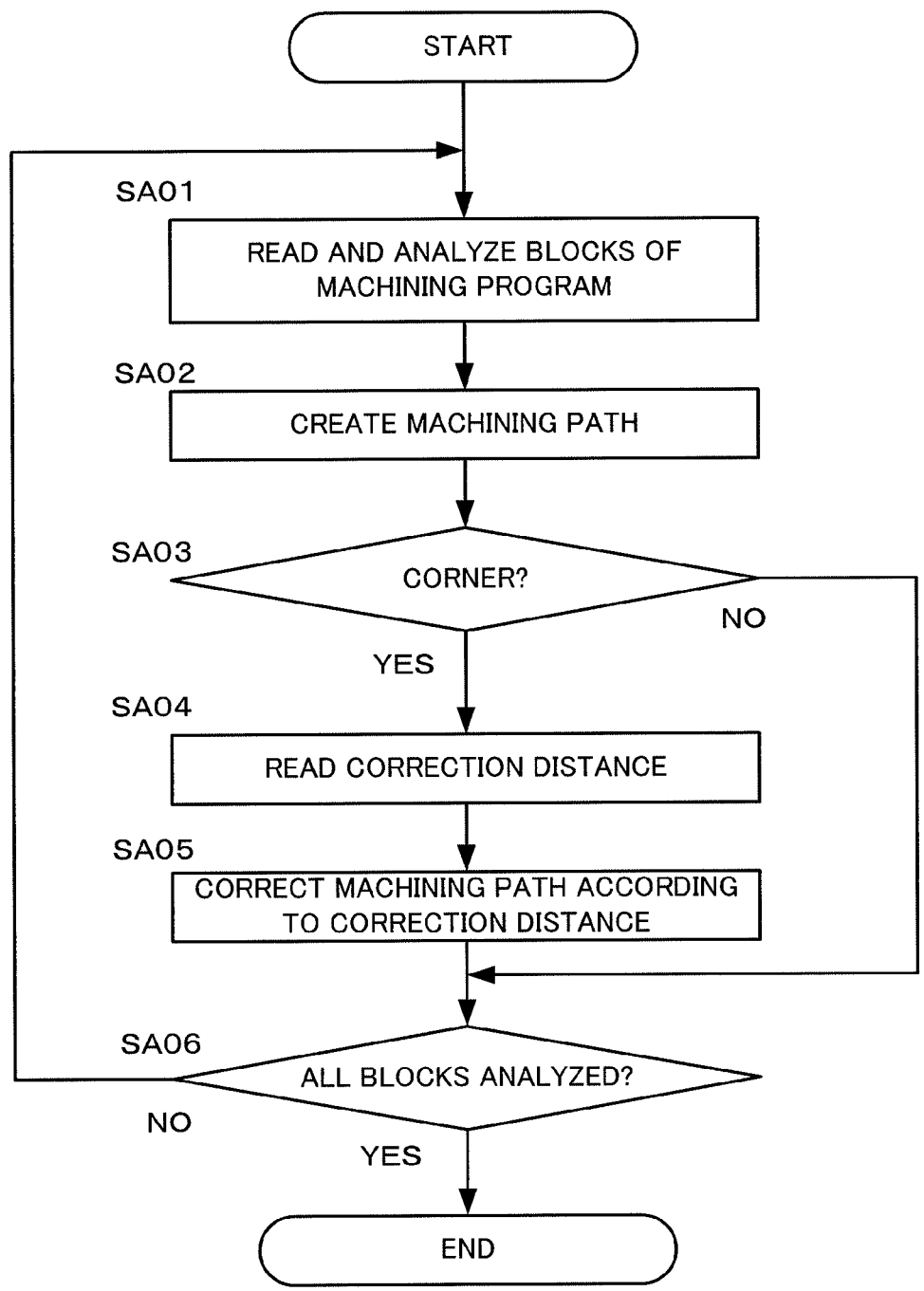
FIG. 12 is a flowchart illustrating a machining path correction process performed by the wire electrical discharge machine of FIG. 10.

A machining path correction process performed by the wire electrical discharge machine according to the first embodiment of the present invention will be described below on a step by step basis with reference to a flowchart of FIG. 12.

[Step SA01] Blocks of the machining program are read and analyzed.
[Step SA02] A machining path is created.
[Step SA03] It is determined whether the machining path is a corner (concave corner or convex corner) or not. If the machining path is a corner, the process proceeds to step SA04, otherwise, the process proceeds to step SA06.
[Step SA04] A correction distance is read.
[Step SA05] The machining path is corrected according to the correction distance.
[Step SA06] It is determine whether or not all the blocks have been analyzed. If all the blocks have not been analyzed, process returns to step SA01 to continue the processing, otherwise, this processing is finished.

Second Embodiment

The wire electrical discharge machine according to the first embodiment described above machines a convex corner as well as a concave corner accompanied by an arc block by correcting a machining path. When high-speed machining is performed or a thick plate is machined by the wire electrical discharge machine, it is conceivable that depending on the corner-specific properties described above, sufficient corner accuracy cannot be obtained solely through corrections of the machining path because the machining conditions used involve a strong discharge repulsion force and machining fluid flow.

Figure 13:
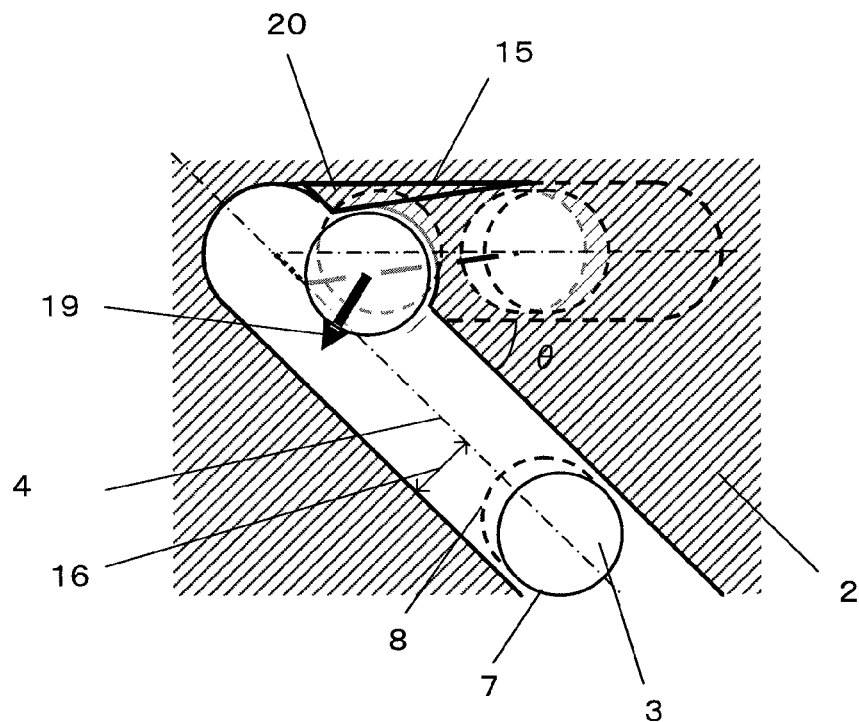
FIG. 13 is a diagram illustrating a machining state which results when electrical discharge machining is performed by a wire electrical discharge machine according to a second embodiment of the present invention based on a corrected machining path.

Specifically, there is a problem in that when machining of a block to be machined second is started by turning around a corner after machining of a block to be machine first is finished, a great machining reaction force acts on the wire electrode under the influence of a powerful discharge repulsion force and machining fluid flow, pulling the wire electrode toward a machined groove produced earlier and thereby leaving an unremoved portion in a corner portion (see an unremoved portion 20 in FIG. 13). Also, the smaller the corner angle of the corner portion, the more conspicuous this problem tends to be.

To deal with this, a wire electrical discharge machine according to a second embodiment of the present invention is configured by adding a function to control the machining fluid and machining energy during machining of the block to be machined second to the wire electrical discharge machine according to the first embodiment described above, in order to reduce the influence of a powerful discharge repulsion force and machining fluid flow. The second embodiment can reduce the machining time required to machine the corner portion compared to conventional machines.

Figure 15:
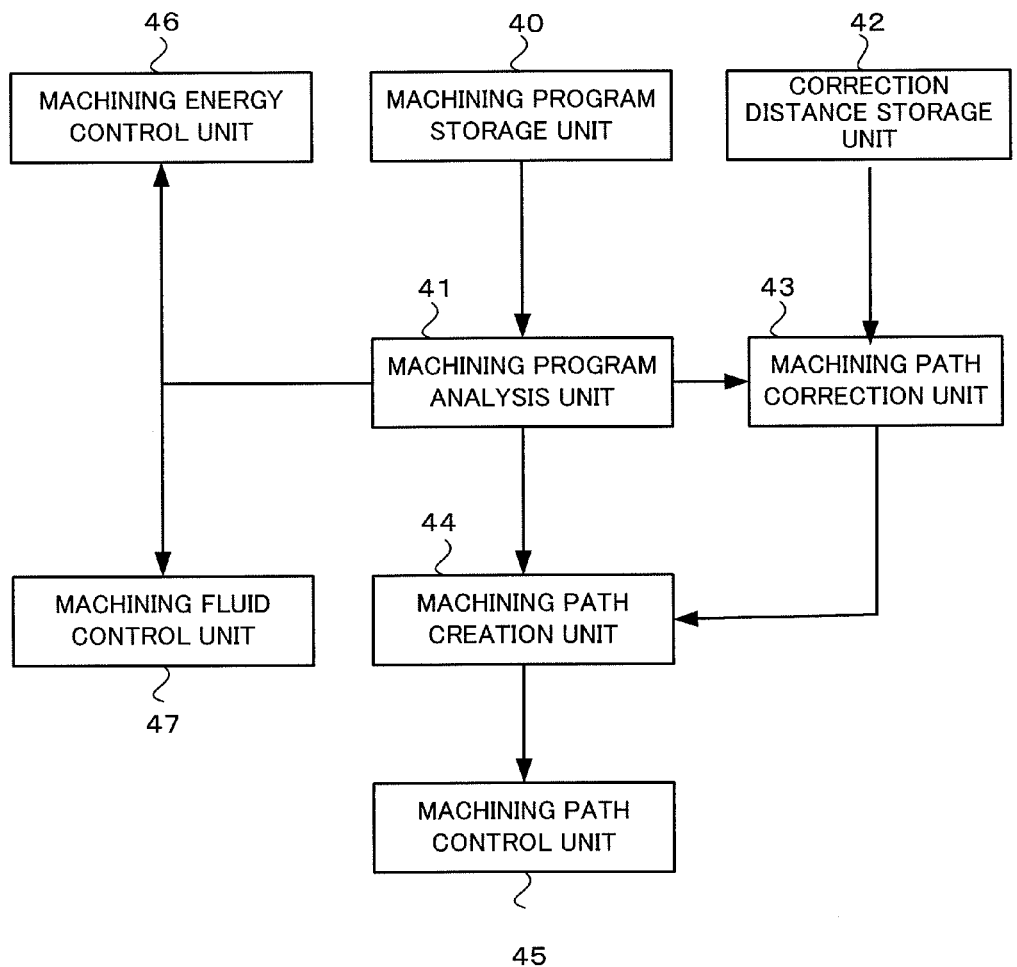
FIG. 15 is a block diagram illustrating principal part of the wire electrical discharge machine according to the second embodiment of the present invention.

Principal part of the wire electrical discharge machine according to the second embodiment of the present invention will be described with reference to FIG. 15.

A machining program stored in the machining program storage unit 40 is passed to the machining program analysis unit 41, and data about the machining path analyzed by the machining program analysis unit 41 is passed to the machining path creation unit 44. When a corner portion is detected, the machining program analysis unit 41 gives path correction instructions to the machining path correction unit 43. Furthermore, a correction distance stored in the correction distance storage unit 42 and used to correct the machining path is passed to the machining path correction unit 43.

Upon receiving the path correction instructions from the machining program analysis unit 41, the machining path correction unit 43 receives the correction distance from the correction distance storage unit 42, creates a corrected path of the corner portion, and passes the created corrected path to the machining path creation unit 44. The machining path creation unit 44 receives the data about the machining path from the machining program analysis unit 41, and creates a machining path. Also, upon receiving the corrected path from the machining path correction unit 43, the machining path creation unit 44 creates a machining path by reflecting the corrected path and passes the created machining path to the machining path control unit 45.

The machining path control unit 45 moves the wire electrode relative to the workpiece according to the machining path received from the machining path creation unit 44. Also, when a machining energy control unit 46 receives control instructions from the machining program analysis unit 41, the machining energy control unit 46 controls machining energy by controlling a discharge quiescent time, ON time, current peak value, and the like. When a machining fluid control unit 47 receives control instructions from the machining program analysis unit 41, the machining fluid control unit 47 controls the amount of the machining fluid used to discharge machining sludge and cool the wire electrode.

A machining path correction process performed by the wire electrical discharge machine according to the second embodiment of the present invention will be described below on a step by step basis with reference to a flowchart of FIG. 17.

[Step SB01] Blocks of the machining program are read and analyzed.

[Step SB02] A machining path is created.

[Step SB03] It is determined whether the machining path is a corner (concave corner or convex corner) or not. If the machining path is a corner, the process proceeds to step SB04, otherwise, the process proceeds to step SB08.

[Step SB04] It is determined whether the block is a block to be machine first or not. If the block is a block to be machine first, the process proceeds to step SB06. If the block is a block to be machined second, the process proceeds to step SB05.

[Step SB05] Control of machining energy and/or the amount of machining fluid is executed and the process proceeds to step SB08.

[Step SB06] A correction distance is read.

[Step SB07] The machining path is corrected according to the correction distance.

[Step SB08] It is determined whether or not all the blocks have been analyzed. If all the blocks have not been analyzed, the process returns to step SB01 to continue the processing, otherwise, this processing is finished.

What is claimed is:

1. A wire electrical discharge machine configured to create a machining path based on an axis movement command from a machining program and to perform machining by moving a wire electrode and a workpiece relative to each other according to the created machining path, the wire electrical discharge machine comprising:
   a machining path correction unit configured to correct the machining path such that
      in a corner portion formed at an intersection of two consecutive movement blocks in the created machining path, the two consecutive movement blocks being a first block to be machined first and a second block to be machined second, a corrected path is generated by extending an original end point of the first block,
   when an extended end point of the first block is reached by moving along the corrected path, a machining path, which returns to the original end point of the first block along the corrected path, is newly created, and
   the second block is machined by continuing from the newly created machining path,
   wherein
   the corner portion is a concave corner of a product to be machined from the workpiece,
   a distance by which the original end point of the first block is extended is equal to a deflection amount of the wire electrode, and
   the machining path correction unit is configured to
      correct the machining path so that the wire electrical discharge machine causes the wire electrode to reach a vertex of the concave corner without decelerating the wire electrode ahead of the vertex and without actually moving the wire electrode beyond the vertex of the concave corner so as to prevent the wire electrode from actually cutting into the product at the concave corner of the product, and
      generate the corrected path and the newly created machining path without causing the wire electrode to actually cut into a machined surface of the product at the concave corner of the product.

2. The wire electrical discharge machine according to claim 1, wherein, in the corner portion, the wire electrical discharge machine is configured to perform machining of the second block by reducing an amount of machining fluid compared to when the first block is machined.

3. The wire electrical discharge machine according to claim 2, wherein, in the corner portion, the wire electrical discharge machine is configured to perform machining of the second block by reducing machining energy compared to when the first block is machined.

* * * * *